(12) United States Patent
Lee et al.

(10) Patent No.: US 9,230,166 B2
(45) Date of Patent: Jan. 5, 2016

(54) APPARATUS AND METHOD FOR DETECTING CAMERA TAMPERING USING EDGE IMAGE

(71) Applicant: SK TELECOM CO., LTD., Seoul (KR)

(72) Inventors: Hee-yul Lee, Daegu (KR); Ki-mun Kim, Seongnam-si (KR)

(73) Assignee: SK TELECOM CO., LTD., Seoul (KR)

( * ) Notice: Subject to any disclaimer, the term of this patent is extended or adjusted under 35 U.S.C. 154(b) by 0 days.

(21) Appl. No.: 14/689,717

(22) Filed: Apr. 17, 2015

(65) Prior Publication Data

US 2015/0220782 A1 Aug. 6, 2015

Related U.S. Application Data

(63) Continuation of application No. PCT/KR2013/008590, filed on Sep. 25, 2013.

(30) Foreign Application Priority Data

Oct. 17, 2012 (KR) ........................ 10-2012-0115645

(51) Int. Cl.
*G06K 9/00* (2006.01)
*G06K 9/62* (2006.01)
*G06T 7/00* (2006.01)

(52) U.S. Cl.
CPC .......... *G06K 9/00624* (2013.01); *G06K 9/6202* (2013.01); *G06T 7/0002* (2013.01); *G06T 7/0085* (2013.01); *G06T 2207/30168* (2013.01); *G06T 2207/30232* (2013.01)

(58) Field of Classification Search
CPC ............. G06K 9/00624; G06K 9/2602; G06T 7/0002; G06T 7/0085; G06T 2207/30168; G06T 2207/30232
See application file for complete search history.

(56) References Cited

U.S. PATENT DOCUMENTS 7,751,647 B2 * 7/2010 Pikaz ............................ 382/278
8,073,261 B2 * 12/2011 Skans ........................... 382/209

(Continued)

FOREIGN PATENT DOCUMENTS

JP       2006109230 A    4/2006
KR    1020080058171 A    6/2008

OTHER PUBLICATIONS

Aksay et al., "Camera tamper detection using wavelet analysis for video surveillance", Advanced Video and Signal Based Surveillance, 2007. AVSS 2007. IEEE Conference on, 558-562.*

(Continued)

*Primary Examiner* — Katrina Fujita
(74) *Attorney, Agent, or Firm* — Hauptman Ham, LLP (57) ABSTRACT

An apparatus for detecting a camera tampering, includes: an image capturing unit to capture at least one image; an input-edge-image generating unit to extract an edge image from an object displayed in the captured image and generate an input edge image by using the extracted edge image; a reference-edge-image generating unit to generate a reference edge image from the input edge image; a stolen-edge-image generating unit configured to generate a stolen edge image by substracting the input edge image from the reference edge image; and a tampering determining unit to compare the input edge image with the reference edge image, compare the reference edge image with the stolen edge image, and determine whether or not a camera tampering has occurred, based on a first similarity and a second similarity.

11 Claims, 6 Drawing Sheets

(56) References Cited

U.S. PATENT DOCUMENTS

| | | | |
|---|---|---|---|
| 8,295,541 B2* | 10/2012 | Naylor et al. | 382/103 |
| 8,300,890 B1* | 10/2012 | Gaikwad et al. | 382/103 |
| 8,718,379 B2* | 5/2014 | Thomas et al. | 382/199 |
| 2006/0020830 A1 | 1/2006 | Roberts | |
| 2007/0247526 A1 | 10/2007 | Flook et al. | |
| 2010/0128126 A1* | 5/2010 | Takeuchi | 348/143 |
| 2011/0221895 A1* | 9/2011 | Sharma | 348/143 |
| 2012/0154581 A1 | 6/2012 | Wang et al. | |

OTHER PUBLICATIONS

Ellwart et al., "Camera sabotage detection for surveillance systems", SIIS'11 Proceedings of the 2011 international conference on Security and Intelligent Information System, 45-53.*

Harasse et al., "Automated Camera Dysfunctions Detection", Image Analysis and Interpretation, 2004. 6th IEEE Southwest Symposium on, 36-40.*

Lin et al., "Real-Time Active Tampering Detection of Surveillance Camera and Implementation on Digital Signal Processor", Jun. 2012, Intelligent Information Hiding and Multimedia Signal Processing (IIH-MSP), 2012 Eighth International Conference on, 383-386.*

Ribnick et al., "Real-Time Detection of Camera Tampering", Video and Signal Based Surveillance, 2006. AVSS '06. IEEE International Conference on.*

Saglam et al., "Real-Time Adaptive Camera Tamper Detection for Video Surveillance", Advanced Video and Signal Based Surveillance, 2009. AVSS '09. Sixth IEEE International Conference on, 430-435.*

Wang et al., "Real-time camera anomaly detection for real-world video surveillance", Machine Learning and Cybernetics (ICMLC), 2011 International Conference on , vol. 4, 1520-1525.*

International Search Report for PCT/KR2013/008590 dated Jan. 6, 2014.

* cited by examiner

FIG. 6

APPARATUS AND METHOD FOR DETECTING CAMERA TAMPERING USING EDGE IMAGE

CROSS-REFERENCE TO RELATED APPLICATIONS

The present application is a continuation of International Patent Application No. PCT/KR2013/008590, filed Sep. 25, 2013, which is based on and claims priority to Korean Patent Application No. 10-2012-0115645, filed on Oct. 17, 2012. The disclosures of the above-listed applications are hereby incorporated by reference herein in their entirety.

TECHNICAL FIELD

The present disclosure relates to an apparatus and a method of detecting camera tampering using a stolen edge image.

BACKGROUND

The statements in this section merely provide background information related to the present disclosure and do not necessarily constitute prior art.

When an image of a fixed area is continuously inputted, such as to a closed-circuit television (CCTV) or the like, and when an abnormality has occurred in a camera, a technique to analyze the abnormality is required. A known image determining apparatus receives an image and generates an input edge image of an object appearing on the image by obtaining a gradient of the image. Thereafter, the image determining apparatus determines a similarity value of the input edge image to a reference edge image that is an accumulated image with a fixed edge. When the similarity value is less than a predetermined value, the image determining apparatus generates a tampering mark. When this tampering mark is generated on a predetermined number of consecutive images, it is determined that a tampering has occurred. When there is no tampering, the reference edge image is updated, thus determining whether or not a camera tampering has occurred.

The tampering means a state in which a normal image input is hampered due to an abnormality of a camera. In other words, the tampering includes not only a trouble of the device itself such as a damage on a lens of the camera but also an inability to input an image in a set area due to a directional change of the camera or an obstacle placed in front of the lens.

SUMMARY

According to some embodiments of the present disclosure, an apparatus for detecting a camera tempering includes at least one image capturing unit configured to capture an image, an input-edge-image generating unit configured to extract an edge image from an object displayed in the captured image and generate an input edge image from an edge by using the extracted edge image from the image, a reference-edge-image generating unit configured to generate a reference edge image from the input edge image, a stolen-edge-image generating unit configured to generate a stolen edge image by substracting the input edge image from the reference edge image, and a tampering determining unit. The tampering determining unit is configured to compare the input edge image with the reference edge image for calculating a first similarity between the input edge image and the reference edge image, to compare the reference edge image with the stolen edge image for calculating a second similarity between the reference edge image and the stolen edge image, and to determine whether or not a camera tampering has occurred, based on the first similarity and the second similarity.

According to another embodiment of the present disclosure, a method for detecting a camera tempering, includes: capturing at least one image from an image capturing unit; extracting an edge image from an object displayed in the captured image; generating an input edge image by using the extracted edge image; generating a reference edge image by using a repeated portion of the input edge image; calculating a first similarity between the input edge image and the reference edge image; generating a stolen edge image by substracting the input edge image from the reference edge image; calculating a second similarity between the stolen edge image and the reference edge image; and determining whether or not a tampering has occurred, based on the first similarity and the second similarity.

DETAILED DESCRIPTION

Hereinafter, exemplary embodiments of the present disclosure are described in detail with reference to the accompanying drawings.

Some embodiments of the present disclosure provide a method and an apparatus for detecting a camera tampering by using a stolen edge image not to make a faulty determination of a tampering from an image having a number of moving objects.

Figure 1A:
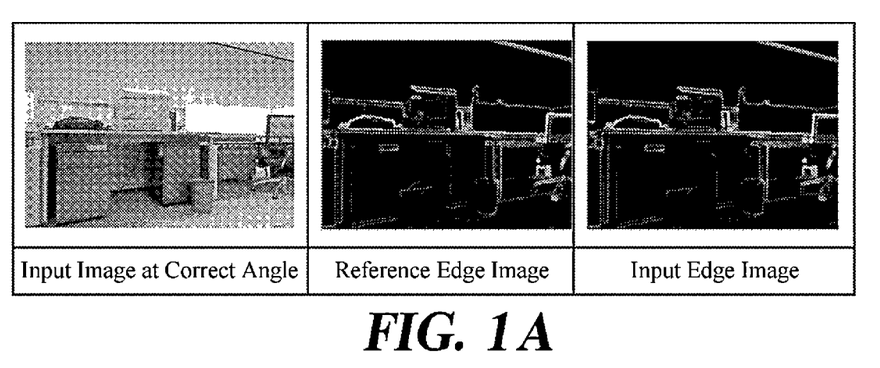
FIGS. 1A and 1B are a set of pictures of input image, reference edge image and input edge image in a normal state and in a state where a tampering has occurred.
Figure 1B:
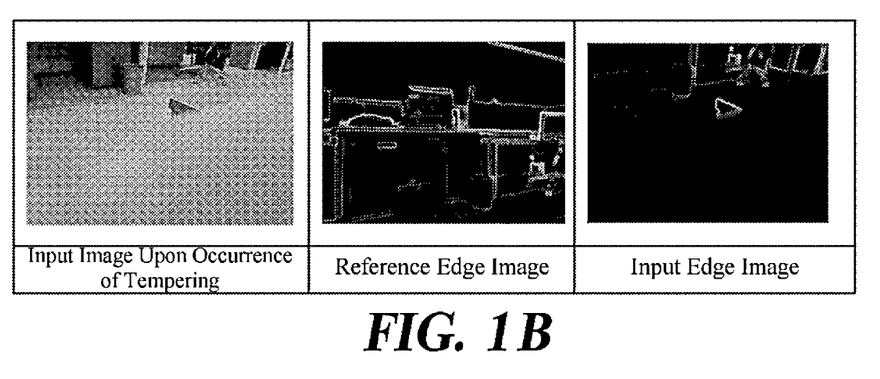

FIGS. 1A and 1B are a set of pictures of input image, reference edge image, and input edge image in a normal state over a state in which a tampering has occurred. FIG. 1A is a set of pictures of input image, reference edge image, and input edge image in the normal state. FIG. 1B is a set of pictures of input image, reference edge image, and input edge image in the state where a tampering has occurred. When an image is inputted, the image determining apparatus generates an input edge image, and collects a common portion of the input edge image for a predetermined time to generate a reference edge image. When an abnormality has occurred on the camera, i.e., when a tampering has occurred, the reference edge image considerably differs from the input edge image, which can be detected based on a similarity therebetween.

Figure 2:
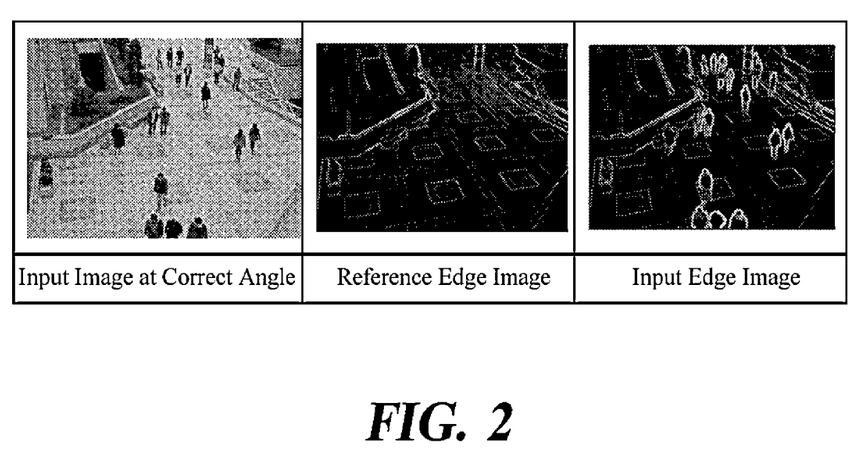
FIG. 2 is a set of pictures of input image, reference edge image and input edge image in case where a faulty determination of a tampering is made due to multiple moving objects.

FIG. 2 is a set of pictures of input image, reference edge image, and input edge image in case where a faulty determination of a tampering is made due to a number of moving objects. As explained with reference to FIGS. 1A and 1B, the known tampering detection is performed based on a similarity value obtained from a difference between an input edge image and a reference edge image of a received image.

The inventor(s) has noted that a known image determining apparatus that employs the similarity value based on the difference between the input edge image and the reference edge image of the received image does not recognize a tampering, even though it has occurred, particularly when an edge of a background is small or makes a faulty determination of a tampering due to a reduced similarity when there are more incoming objects to introduce more new edges in the image.

The inventor(s) has experienced that in the case shown in FIG. 2, the plenty of moving objects with abundant newly introduced edges in the input edge image cause the input edge image to be mistaken as less similar to the reference edge image, thereby leading to a faulty determination of a tampering.

The inventor(s) has experienced that In this manner, the known technique makes faulty determinations of tampering due to edges of moving objects or even due to a small occlusion background edge occluded by a moving object.

The inventor(s) has also experienced that a method and an apparatus for detecting a tampering are necessary, which is not affected by an edge image generated by a moving object.

Some embodiments of the present disclosure provide a method for reducing possibility of making a faulty determination of a tampering with an additional determination of whether or not a tampering has occurred, by comparing a stolen edge image with a reference edge image. The stolen edge image refers to an image obtained by subtracting an input edge image from a reference edge image. The stolen edge image exhibits a large pixel value when a strongly expressed edge in a background is reduced or zeroed by the occlusion of a moving object, and the stolen edge image exhibits a negative pixel value of an edge when a nonexistent edge in the background appears on the input edge image. On the other hand, as all pixel values of a typical edge image take positive values, known similarity determining methods calculate the similarity between positive pixel values. Therefore, the pixel value of the stolen edge image, which takes the negative value, is an unpredictable input value in the known similarity determining method, and hence it hinders the proper calculation of a similarity between the stolen edge image and the reference edge image, which will be described later. To cope with the deficiency, a tampering detecting apparatus according to some embodiments regards the determined negative pixel as zero, regards as "similar" when determining the similarity or determines the determined negative pixel having no contribution to "similarity" when determining the similarity between the relevant pixel of the determined negative pixel and the reference edge image. Because the determined negative pixel is a pixel that does not exist on the reference edge image but exhibits a value only on the input edge image, the tampering detecting apparatus assumes that it is an edge generated by a moving object. Therefore, the tampering detecting apparatus can remove the influence of the edge generated by a moving object on the similarity determination by removing the negative-valued edge generated in the stolen edge image. The tampering detecting apparatus obtains a similar effect in generating the stolen edge image by removing a common portion of the reference edge image and the input edge image (by sequentially applying an XOR gate and an AND gate).

In other words, when a portion having a large edge value in the reference edge image shows a small edge value on the input edge image, it takes a relatively large pixel value on the stolen edge image. When a portion having a large edge value in the reference edge image also shows a large edge value on the input edge image, it takes a near zero pixel value on the stolen edge image. In general, an edge of the reference edge image, which is deleted by a newly appearing object in the input edge image, exhibits a large pixel value.

Figure 3A:
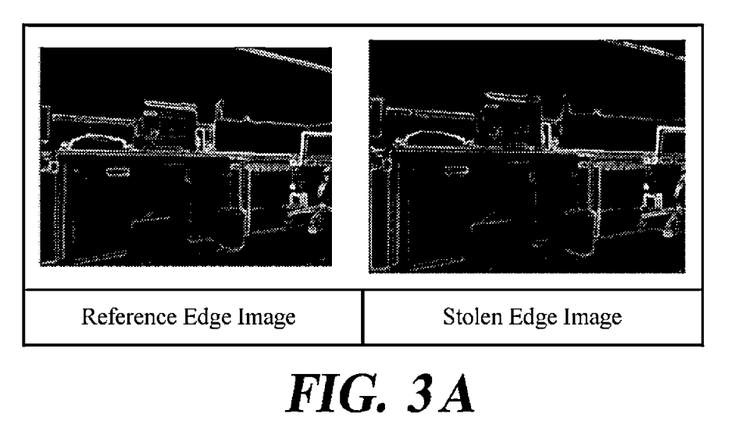
FIGS. 3A to 3B are a set of pictures of target images for determining the similarity between a reference edge image and a stolen edge image in case of a tampering occurred and in case of multiple moving objects, according to some embodiments of the present disclosure.
Figure 3B:
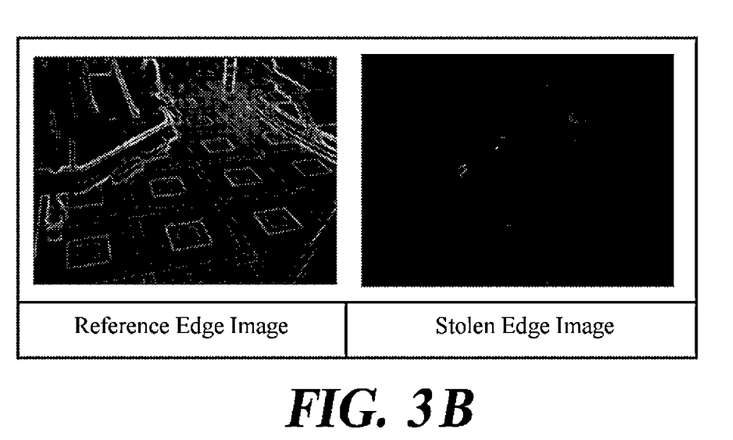

FIGS. 3A and 3B are a set of pictures of target images for determining the similarity between a reference edge image and a stolen edge image in case of a tampering occurred and in case of multiple moving objects, according to some embodiments of the present disclosure.

FIG. 3A is a set of pictures reference edge image and stolen edge image in the case where a tampering has occurred. When a tampering occurred, the stolen edge image obtained by subtracting the input edge image from the reference edge image is similar to the reference edge image since the input edge image has virtually no common edge portion with the reference edge image. Therefore, the reference edge image and the stolen edge image are determined to have a high similarity therebetween.

FIG. 3B is a set of pictures of reference edge image and stolen edge image in case there are quite a number of moving objects. With multiple moving objects, the moving objects have edges larger than that of the reference edge image to output zero pixel values on the stolen edge image, and a background edge portion occluded by a moving object does not appear in the input edge image but turns to show up on the stolen edge image. However, as long as the moving objects do not occlude considerable part of the picture, the unoccluded portions are all removed to show an edge on a tiny fraction of the stolen edge image. The edge appearing at this time is a residual edge obtained by subtracting the input edge image from the reference edge image. Therefore, when there are a number of moving objects, the stolen edge image is determined to have a little similarity with the reference edge image.

FIG. 4 is a set of schematic diagrams of a reference edge image, input edge images, and stolen edge images for illustrating a concept of the stolen edge image according to some embodiments of the present disclosure.

Figure 4A:
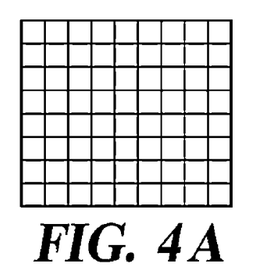
FIGS. 4A to 4G are a set of schematic diagrams of a reference edge image, input edge images and stolen edge images for illustrating a concept of the stolen edge image according to some embodiments of the present disclosure.

FIG. 4A represents the reference edge image. The tampering detecting apparatus receives input edge images for a predetermined time, and when the same edge continues to present in the images, it establishes the corresponding pixels as a way of generating the reference edge image. Therefore, the reference edge image is considered to be a background edge image when repetitive edges appear in the input edge images.

Figure 4B:
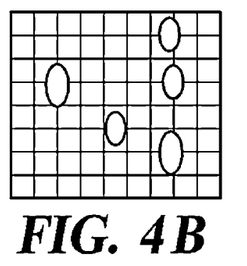
Figure 4C:
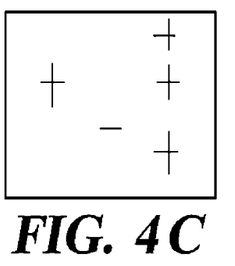
Figure 4D:
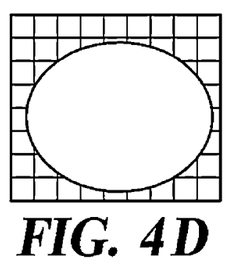
Figure 4E:
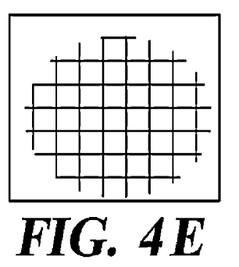
Figure 4F:
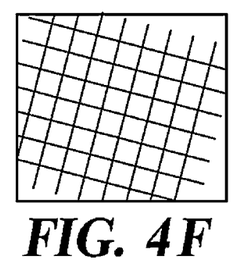

FIGS. 4B, 4D and 4F represent input edge images. FIG. 4B represents an input edge image of a typical situation in which moving objects appear at multiple locations. In general, the moving object appears smaller than the image size; and it is detected as a tampering because the similarity in this case between the reference edge image and the input edge images is likely to be decreased. FIG. 4D illustrates a case where the camera is blocked, corresponding to a case where a tampering has occurred. The blockage of the camera happens in various elements, such as a spray, a hand, an object, and the likes. FIG. 4F illustrates a case where the angle of the camera is changed, corresponding to an occurrence of tampering.

Figure 4G:
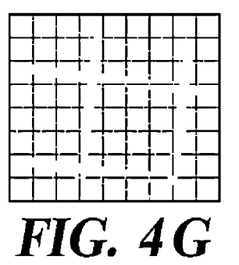

FIGS. 4C, 4E and 4G illustrate stolen edge images obtained by subtracting images of FIGS. 4B, 4D and 4F from the reference edge image of FIG. 4A, respectively, which can be defined by Equation 1.

$$\text{Stolen Edge} = R - I \qquad \text{Equation 1}$$

In Equation 1, R is the reference edge image, I is the input edge image.

Pixels in the stolen edge image, which have values less than zero, are regarded as zeros, and a similar effect is obtained by the similarity determination after excluding the negative-valued pixels from the stolen edge image.

FIG. 4C illustrates a first case where less edges appear in the stolen edge image and less edges of the background are covered, although there are many but small moving objects in the input edge image shown in FIG. 4B. FIG. 4E illustrates a second case where many edges of the background appear on the stolen edge image because the camera is blocked by a big object in the input edge image shown in FIG. 4D. FIG. 4G illustrates a third case where many background edges remain in the stolen edge image because edges on the input edge image shown in FIG. 4F does not occlude much of the background edges.

As illustrated in FIGS. 4A to 4G, comparing the similarities between the stolen edge image and the reference edge image enables not only the detection of a tampering situation relative to the camera blockage and the camera angle change but also a reduced faulty determination of a tampering which is caused when there are a number of moving objects. At least one embodiment determines the occurrence of tempering by considering both a first similarity calculated between the reference edge image and the input edge image and a second similarity calculated between the reference edge image and the stolen edge image.

Figure 5:
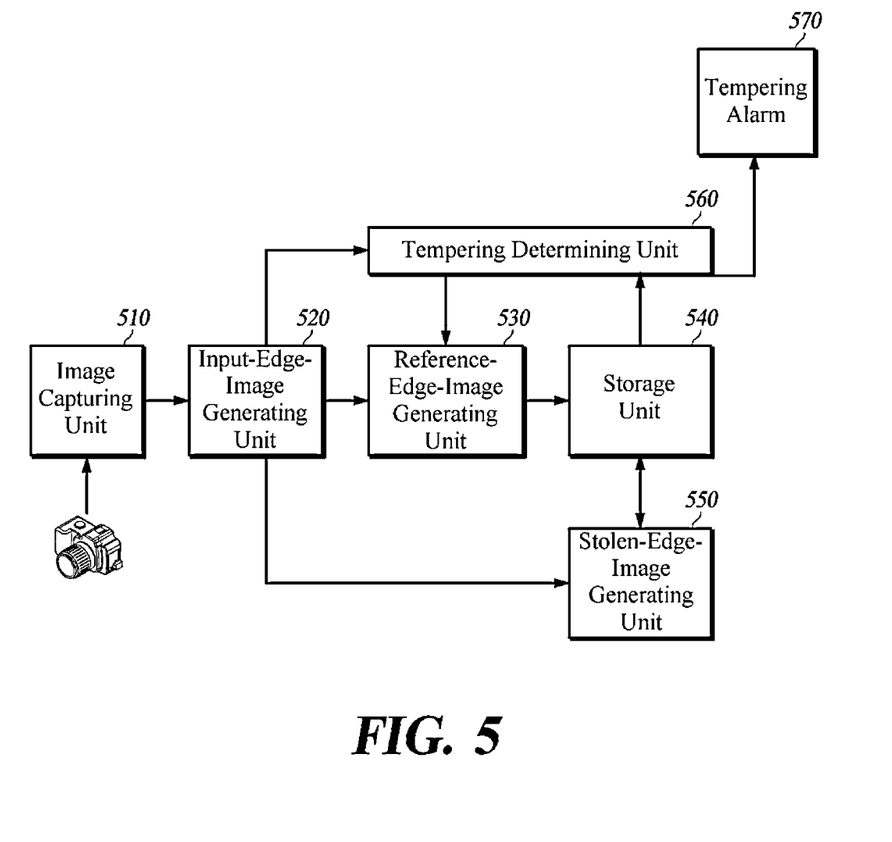
FIG. 5 is a block diagram of a tempering detecting apparatus according to some embodiments of the present disclosure.

FIG. 5 is a block diagram of a tempering detecting apparatus according to some embodiments of the present disclosure, which include the following components.

An image capturing unit 510 captures video images. The tampering detecting apparatus is incorporated into the camera, or only receives image information from the camera. For example, the image capturing unit 510 is implemented by a closed-circuit television (CCTV) camera, a video surveillance camera, and the like which are capable of capturing the video images.

An input-edge-image generating unit 520 generates an input edge image (gradient magnitude image) from the captured images. That is, the input-edge-image generating unit 520 extracts an edge image(s) from one or more objects displayed in the captured image the captured images and generates an input edge image by using the extracted edge image(s).

A reference-edge-image generating unit 530 accumulates edge information from the input edge images for a predetermined time, and generates a reference edge image characterized by including edges (e.g, edge images or image pixels corresponding to edges) with little change which indicates, for example, changeless than a predetermined degree of change of the edges in the extracted image. The reference edge image serves as a reference target used to determine an abrupt change between the images. After a predetermined time of operation, the reference-edge-image generating unit 530 utilizes the input edge image that has not been determined to be tampered with by its tampering determining unit 560 for correcting a portion of the reference edge image, which differs from the input edge image, to approximate the pixel values of the input edge image. Through this reference edge image correction, the reference-edge-image generating unit 530 generates a reference edge image that is adaptively reflected by changes in the reference edge in concert with changes of daylight and shadow.

A storage unit 540 stores therein the reference edge image or the stolen edge image, and supplies the stored image to the tampering determining unit 560 or a stolen-edge-image generating unit 550.

The stolen-edge-image generating unit 550 generates a stolen edge image by subtracting the input edge image from the reference edge image. The stolen-edge-image generating unit 550 has negative-valued pixels in the stolen edge image replaced with zeros.

The tampering determining unit 560 compares the input edge image with the reference edge image to calculate the first similarity, and compares the reference edge image with the stolen edge image to calculate the second similarity. The tampering determining unit 560 calculates a third similarity by subtracting the second similarity from the first similarity, and when the third similarity is less than a predetermined threshold, e.g. 0.7 in 0-1.0 scale, determines that a tampering has occurred. The tampering determining unit 560 calculates the first similarity first, and when it is greater than or equal to a predetermined threshold, e.g. 0.7 in 0-1.0 scale, determines that no tampering has occurred. When the determination is made based on the first similarity that has been calculated first, there is no need for calculating the second similarity or generating the stolen edge image, and hence it can control the stolen-edge-image generating unit 550 not to generate the stolen edge image, eliminating the necessity of calculating the second similarity. Although the tampering determining unit 560 uses any methods for calculating the similarity as long as they do so by receiving the two images, when there are nonegative-valued pixels in the stolen edge image replaced with zeros, the tampering determining unit 560 determines the similarity of the negative-valued pixels to be the maximum (identical).

A tampering alarm unit 570 receives a signal indicating that a tampering has occurred from the tampering determining unit 560, and notifies the fact that the tampering has occurred. The tampering determining unit 560 or the tampering alarm unit 570 confirms and notifies the occurrence of the tampering with a predetermined duration of the determination that the tampering has occurred.

Other components of the tempering detecting apparatus, such as each of the input-edge-image generating unit 520, the reference-edge-image generating unit 530, the stolen-edge-image generating unit 550, and the tampering determining unit 560, is implemented by, or includes, one or more processors and/or application-specific integrated circuits (ASICs). The tempering detecting apparatus also comprises one or more input units such as one or more buttons, a touch screen, a mic and so on, and one or more output units such as a display, an indicator and so on.

Figure 6:
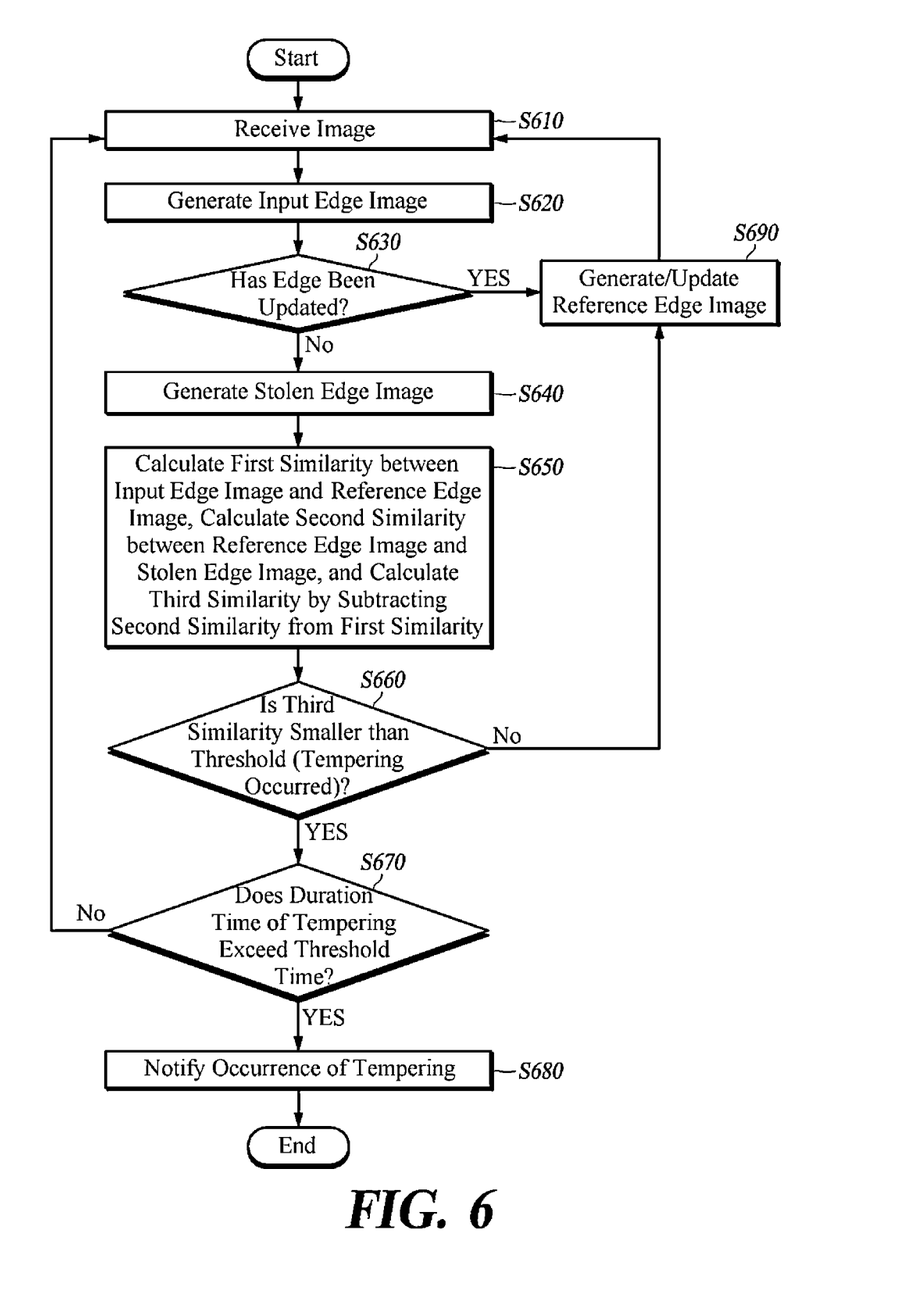
FIG. 6 is a flowchart showing a method of detecting a tampering according to some embodiments of the present disclosure.

FIG. 6 is a flowchart showing a method of detecting a tampering, according to some embodiments of the present disclosure.

At least one image is received at Step S610. Although it is described that the determination of a tampering is performed for each frame, one or more image inputs for determining a tampering are periodically performed.

The tampering detecting apparatus performs an edge image generation (Step S620) to generate the input edge images by calculating the gradient of the input image.

The tampering detecting apparatus performs an edge update determination (Step S630) to determine whether or not the tampering detecting apparatus is in a state of generating the reference edge image for a predetermined time at its initial operational stage. As the tampering detecting apparatus employs the reference edge image when calculating the similarity, the reference edge image is generated upon operating the camera to serve the subsequent steps. Therefore, the tampering detecting apparatus starts with generating the reference edge image. The tampering detecting apparatus can substitute the step of generating the reference edge image with a step of checking the sequence of the frame, i.e., how many frames have passed to the current frame from the input of the image. When it is a state of updating the edge, a step of updating the reference edge image is performed (Step S690).

When a result of the determination at Step S630 indicates that it is not a state of updating the edge, the tampering detecting apparatus performs a step of generating the stolen edge image (Step S640). The tampering detecting apparatus performs the step of generating the stolen edge image (Step S640) to generate the stolen edge image by subtracting the input edge image from the reference edge image. At Step S640, the tampering detecting apparatus is configured to replace a value less than zero with zero.

The tampering detecting apparatus calculates the first similarity between the input edge image and the reference edge image and the second similarity between the reference edge image and the stolen edge image and calculates the third similarity by subtracting the second similarity from the first similarity at a step of calculating the similarity (Step S650).

The tampering detecting apparatus determines whether or not a tampering has occurred based on whether or not the third similarity exceeds a predetermined threshold at a step of determining a tampering (Step S660). When it is determined that no tampering has occurred at Step S660, the tampering detecting apparatus performs a step of updating the reference edge image (Step S690).

The tampering detecting apparatus generates or corrects the reference edge image such that a change of the input edge image is reflected on the reference edge image at a step of updating the reference edge image (Step S690). At Step S690, the tampering detecting apparatus is configured to compare the input edge image with the reference edge image and correct the reference edge image such that a difference between the input edge image and the reference edge image is decreased by a predetermined ratio.

When it is determined that a tampering has occurred at a step of determining a tampering duration time (Step S670), the tampering detecting apparatus determines whether or not the tampering has occurred with respect to the input edge image by the threshold number of frames, e.g., 30. When the determination of the tampering has continued for a predetermined time, the tampering detecting apparatus confirms that the tampering has occurred and performs a step of alarming the tampering (Step S680), but otherwise the tampering detecting apparatus restarts the step of determining a tampering for a new input image.

The tampering detecting unit outputs a notification of the occurrence of the tampering to an outside (e.g., output units such as a display, an indicator, speaker, alarm beef and so on) at the tampering alarm step (S680). Some exemplary methods of outputting the notification by the tampering detecting unit include any possible ways such as, for example, sound, image, data, and the like.

According to various embodiments as described above, by adding a step of taking account of a similarity between the stolen edge image and the reference edge image, some embodiments of the present disclosure reduces a faulty determination of a tampering from images overcrowded with moving objects.

Although exemplary embodiments of the present disclosure have been described for illustrative purposes, those skilled in the art will appreciate that various modifications, additions and substitutions are possible, without departing from the spirit and scope of the claimed invention. Specific terms used in this disclosure and drawings are used for illustrative purposes and not to be considered as limitations of the present disclosure. Therefore, exemplary embodiments of the present disclosure have been described for the sake of brevity and clarity. Accordingly, one of ordinary skill in the pertinent art would understand the scope of the claimed invention is not limited by the explicitly described above embodiments but by the claims and equivalents thereof.

What is claimed is:

1. An apparatus for detecting a camera tampering, the apparatus comprising:
    an image capturing unit configured to capture at least one image;
    an input-edge-image generating unit configured to
        extract an edge image from an object displayed in the captured image and
        generate an input edge image by using the extracted edge image;
    a reference-edge-image generating unit configured to generate a reference edge image from the input edge image;
    a stolen-edge-image generating unit configured to generate a stolen edge image by subtracting the input edge image from the reference edge image; and
    a tampering determining unit configured to
        compare the input edge image with the reference edge image for calculating a first similarity between the input edge image and the reference edge image,
        compare the reference edge image with the stolen edge image for calculating a second similarity between the reference edge image and the stolen edge image, and
        determine whether or not a camera tampering has occurred, based on the first similarity and the second similarity.

2. The apparatus according to claim 1, wherein the tampering determining unit is configured to
    calculate a third similarity by subtracting the second similarity from the first similarity, and
    determine that the camera tampering has occurred, when the third similarity is less than a predetermined threshold.

3. The apparatus according to claim 1, wherein the reference-edge-image generating unit is configured to
    extract an edge image that is repeated for a predetermined time from the input edge image,
    generate the reference edge image by accumulating edge information from the input edge image for the predetermined time, and
    update the reference edge image per the predetermined time.

4. The apparatus according to claim 1, wherein the reference-edge-image generating unit is configured to
    receive a determination result from the tampering determining unit, and
    update the reference edge image based on the input edge image, when the determination result indicates that the tampering has not occurred.

5. The apparatus according to claim 1, further comprising a tampering alarm unit configured to output tampering occurrence information, when a determination result from the tampering determining unit indicates that the tampering has occurred.

6. The apparatus according to claim 1, wherein the tampering determining unit is configured to calculate the second similarity when the first similarity is less than a predetermined threshold.

7. The apparatus according to claim 1, wherein when the first similarity is higher than a predetermined threshold, the tampering determining unit is configured to control the stolen-edge-image generating unit to stop generation of the stolen edge image.

8. The apparatus according to claim 1, wherein the stolen-edge-image generating unit is configured to
  replace a pixel having a negative value among pixels of the stolen edge image with zero, or
  regard the pixel having a negative value among the pixels of the stolen edge image as a pixel having no contribution to the first similarity or the second similarity.

9. A method performed by an apparatus for detecting a camera tampering, the method comprising:
  capturing at least one image from an image capturing unit;
  extracting an edge image from an object displayed in the captured image;
  generating an input edge image by using the extracted edge image;
  generating a reference edge image by using a repeated portion of the input edge image;
  calculating a first similarity between the input edge image and the reference edge image;
  generating a stolen edge image by subtracting the input edge image from the reference edge image;
  calculating a second similarity between the stolen edge image and the reference edge image; and
  determining whether or not a tampering has occurred, based on the first similarity and the second similarity.

10. The method according to claim 9, wherein the determining of whether the tampering has occurred comprises
  calculating a third similarity by subtracting the second similarity from the first similarity, and
  determining that the tampering has occurred, when the third similarity is less than a predetermined threshold.

11. The method according to claim 9, wherein the generating of the reference edge image further comprises
  updating the reference edge image based on the input edge image, when the determining indicates that the tampering has not occurred.

\* \* \* \* \*